United States Patent
Lopez Stanizzi

(10) Patent No.: US 12,454,291 B2
(45) Date of Patent: Oct. 28, 2025

(54) ENERGY CONVERSION AND RECOVERY SYSTEM THROUGH THE PASSAGE OF A SUBWAY

(71) Applicants: Fernando Javier Lopez Stanizzi, Estado de Morelos (MX); Gustavo Osvaldo Martinez, Cordoba (AR)

(72) Inventor: Fernando Javier Lopez Stanizzi, Estado de Morelos (MX)

(73) Assignees: Fernando Javier Lopez Stanizzi, Estado de Morelos (MX); Gustavo Osvaldo Martinez, Cordoba (AR)

(*) Notice: Subject to any disclaimer, the term of this patent is extended or adjusted under 35 U.S.C. 154(b) by 55 days.

(21) Appl. No.: 18/509,834

(22) Filed: Nov. 15, 2023

(65) Prior Publication Data
US 2024/0208553 A1    Jun. 27, 2024

(30) Foreign Application Priority Data
Dec. 27, 2022   (AR) .............................. P20220103616

(51) Int. Cl.
| | | |
|---|---|---|
| *B61B 13/08* | (2006.01) | |
| *B60L 13/04* | (2006.01) | |
| *B60L 53/00* | (2019.01) | |
| *H02J 50/00* | (2016.01) | |
| *H02J 50/10* | (2016.01) | |

(52) U.S. Cl.
CPC .............. *B61B 13/08* (2013.01); *B60L 13/04* (2013.01); *B60L 53/00* (2019.02); *H02J 50/001* (2020.01); *H02J 50/10* (2016.02); *B60L 2200/26* (2013.01)

(58) Field of Classification Search
None
See application file for complete search history.

(56) References Cited

U.S. PATENT DOCUMENTS

| | | | | |
|---|---|---|---|---|
| 2007/0089636 A1* | 4/2007 | Guardo | ................... | B60L 13/10 |
| | | | | 104/281 |
| 2022/0032781 A1* | 2/2022 | Veltman | ................... | B60L 50/60 |
| 2023/0109536 A1* | 4/2023 | Smith | ..................... | H02J 50/10 |
| | | | | 105/50 |

* cited by examiner

*Primary Examiner* — Rexford N Barnie
*Assistant Examiner* — Joel Barnett
(74) *Attorney, Agent, or Firm* — Defillo & Associates, Inc.; Evelyn A. Defillo

(57) ABSTRACT

A system for generating and recovering energy by the passage of a subway train having a special lithium accumulator module at each station, a levitating, high efficiency magnetic suspension motor-generator mounted on two discs, a number of induction coils mounted along the path and on both sides of the rails, and an induction coil mounted in the center of the rails along the path, a number of inductor plates mounted at each station, a number of receiver coils also at each station, a permanent magnetic medium mounted on each disk, a magnetic suspension drive between the disk and the generator and a levitating drive between the disk and the motor; it being noted that all such moving parts are frictionless with respect to each other.

7 Claims, 3 Drawing Sheets

ENERGY CONVERSION AND RECOVERY SYSTEM THROUGH THE PASSAGE OF A SUBWAY

FIELD OF THE INVENTION

The present invention consists of an energy conversion and recovery system by means of the passage of a subway train.

In order to make it understandable so that it can be easily put into practice, a precise description of a preferred way of realization will be given in the following paragraphs.

Such description is complemented with several figures and images of a functional model, which allow to exemplify the invention without such description and figures being considered in any case limiting the invention.

The components referred to in the description are unique to the invention and form part of the principles of the invention set forth herein.

BACKGROUND OF THE INVENTION

We know that the movement of a vehicle generates friction against the medium in which it moves, and this friction is modified according to the characteristics of the medium and the elements of the vehicle that come into contact with this medium.

Indeed, the movement of the vehicle is affected by the density of the medium in which it moves, but also by the elements of the vehicle that produce friction such as wheels and metal plates, tires, hulls of aircraft or ships, as well as the outer surface of the vehicle, and depending on its shape and aerodynamic lines will produce different frictions and energies.

For the purposes of the present invention, an energy generation and recovery system applicable to a subway train is proposed so that the components of such a system can be defined, which can then—and with minimal variations—be adapted and applied to vehicles with other characteristics.

The system has several components designed to contact surfaces arranged throughout the subway path and divert kinetic energy to several levitating magnetic suspension disks that convert mechanical energy into electrical energy by the action of a magnetic field acting on electrical conductors arranged throughout the subway path.

For the purposes of the present description, it is understood that magnetic levitation is the same as magnetic suspension. And magnetic suspension is defined as the action that an object causes on another by keeping it at a distance X, without having a physical contact, using only magnetic fields of equal poles.

The current generated by induction is recovered by a specially designed lithium module at each station, from where it is fully reused for the lighting of tunnels, stations and possible stores installed in the such stations.

SUMMARY OF THE INVENTION

The present invention consists of a system for the generation and recovery of energy by the passage of a subway train comprising a special lithium accumulator module at each station, a levitating, high efficiency magnetic suspension motor-generator mounted on two discs, a number of induction coils mounted along the path and on both sides of the rails, and an induction coil mounted in the center of the rails along the path, a number of inductor plates mounted at each station, a number of receiver coils also at each station, a permanent magnetic medium mounted on each disk, a magnetic suspension drive between the disk and the generator and a levitating drive between the disk and the motor; it being noted that all such moving parts are frictionless with respect to each other.

BRIEF DESCRIPTION OF THE DRAWINGS

Different diagrams and images corresponding to an out-of-scale functional model are provided.

DETAILED DESCRIPTION OF THE INVENTION

Figure 1:
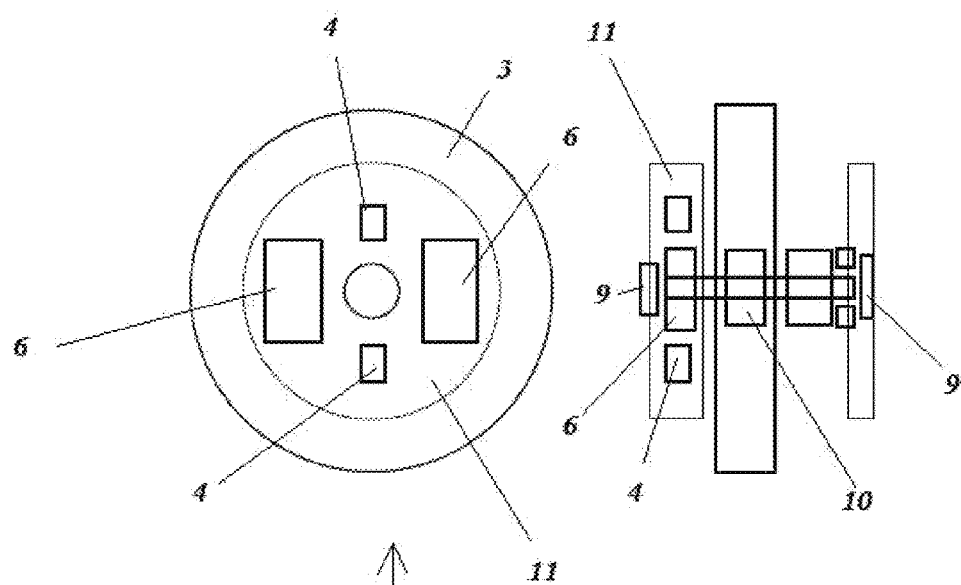
FIG. 1 shows a sketch where the different components and the interrelation between them are represented.
Figure 2:
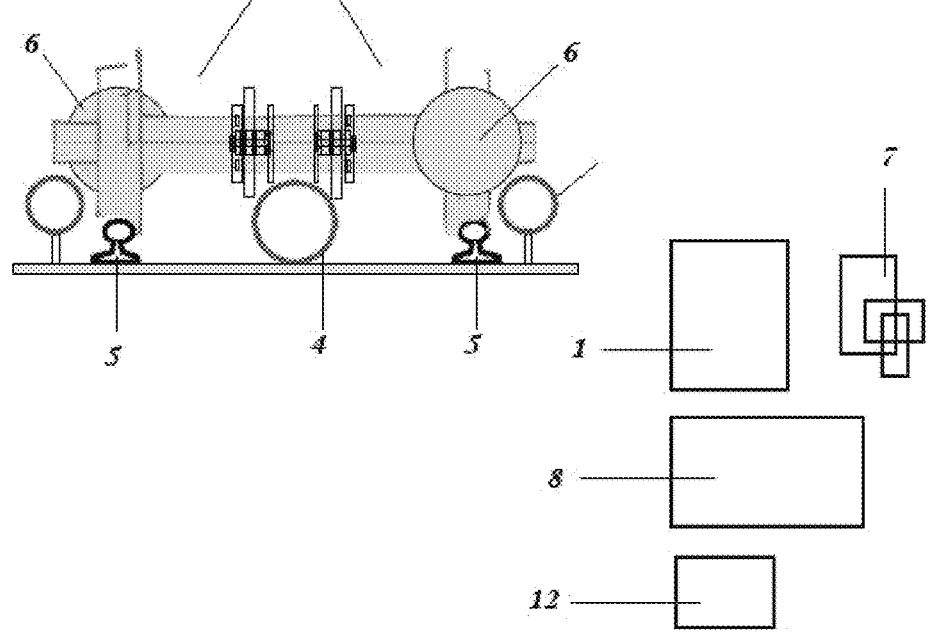
FIG. 2 shows a partial view of the side and bottom of a subway car, one of the rails and one of the coils. It also shows a partial view of the interaction between the coils and the permanent field.
Figure 3:
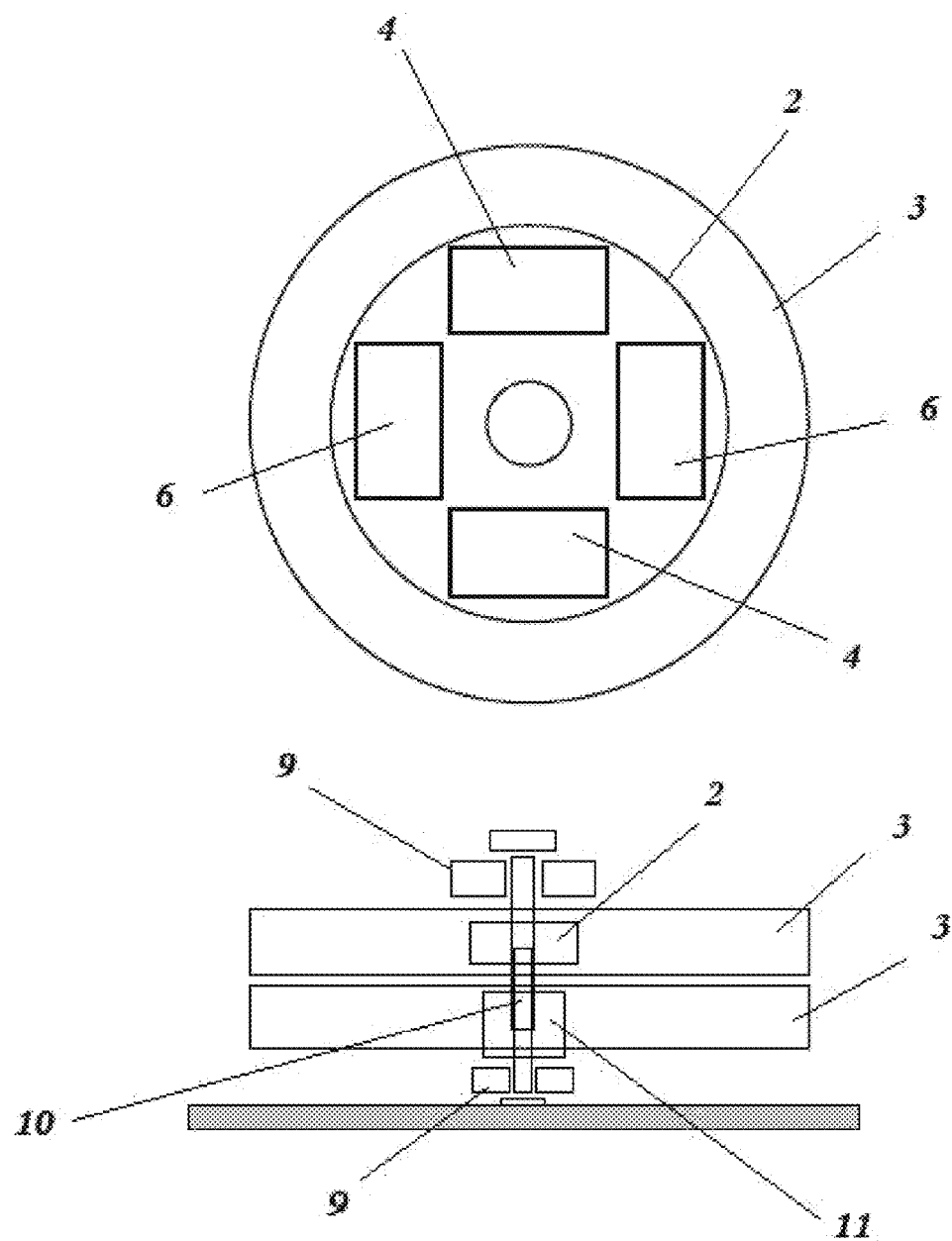
FIG. 3 shows a partial drawing of a magnetic levitation disk, a high efficiency mini starter motor and a high efficiency electric generator.
Figure 4:
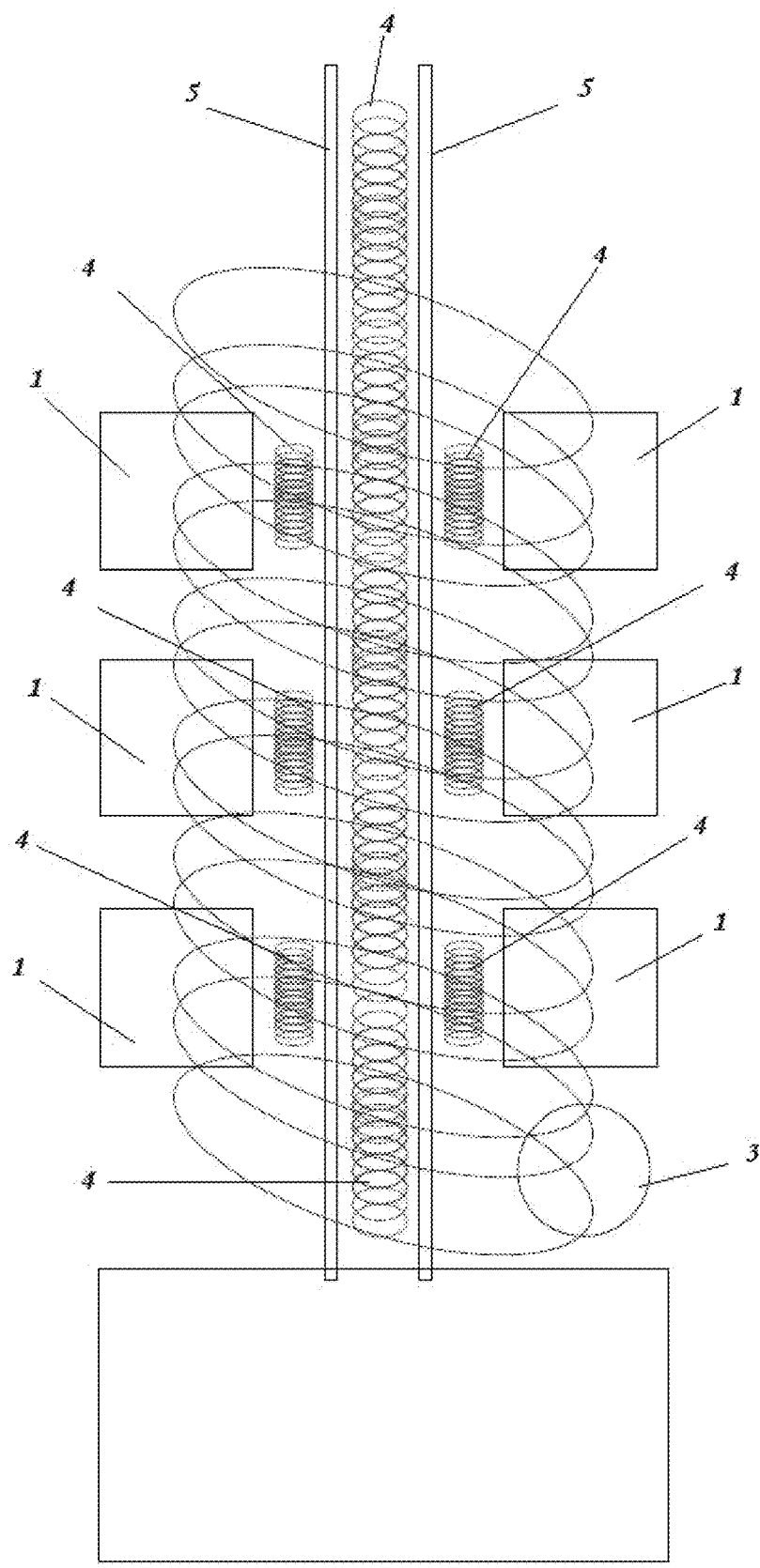
FIG. 4 shows a basic connection diagram.

In the figures, references have been incorporated to allow to individualize the various parts and components of the system that makes the invention.

Reference number -1- a special lithium module, with reference number -2- a magnetic levitation generator, with reference number -3- a magnetic levitation disk, with reference number -4- a coil, with reference number -5- the train rails, with reference number -6- a permanent magnetic module, with reference number -7- a copper plate, with reference number -8- a control module, with reference number -9- a levitating magnetic transmission, with reference number -10- an induction controller, with reference number -11- a high efficiency magnetic levitation mini electric motor and with reference number -12- a power supply.

Once the components of the developed system have been described and in order to explain their nature, they are complemented with their functional and operative relation and the result they provide.

The system of generation and recovery of energy by means of the passage of a subway train described is integrated by at least one special lithium module that recovers, stores and distributes the electrical energy produced by the movement of the subway train together with the levitating magnetic disk installed in each subway car.

When the mini electric motor detects efficiency and rotates the magnetic levitation disk, it generates a proportional induction to a levitating magnetic induction generator, providing electrical pulses that are harnessed by the subway car.

Similarly, each section of the route has several induction coils, which capture the inductive energy of each subway car without friction between the generative parts, this induction turns another group of high efficiency electric motor in solidarity with the high efficiency generator, driven by a levitating magnetic disk at each station.

The control module is present in each car of the train and in each station, as well as in each section of the route, being able to space them every 100 meters.

As the subway train formation moves, the air that is displaced is also used to move other magnetic levitation disks connected to a high-efficiency generator and a mini-motor with the same characteristics.

Finally, the electrical energy from the high efficiency magnetic levitation generators is passed to the special lithium modules and from these it can be channeled to the network so that each station becomes self-sufficient and can do without the energy received from the distribution network.

The sequence of the stages describing the invention and the way in which it works has been described, and the documentation is supplemented by a summary of the invention.

CONCLUSION

This invention focuses on the use of the diverse energies produced during the journey of a subway train.

The system isolates the stations from the consumption of the network, storing electrical energy in each station for later use.

It should be noted that all the components involved are frictionless, since there are neither rollers nor any mechanical means for the conversion and recovery of energy, being only magnetic levitation means whose friction is minimal.

In view of the description made, the accompanying figures and references, and given the functional relationship of the different component parts of the present invention referring to an Energy Conversion and Recovery System by means of the passage of a subway train, the following is claimed as of exclusive right.

The invention claimed is:

1. A system for energy conversion and recovery by the passage of a subway train between stations, the system comprising:
   a lithium accumulator module located at each one of the stations,
   a magnetic suspension motor-generator mounted on two disks,
   a plurality of induction coils mounted on both sides of each rail along a path,
   a central induction coil mounted in a center of the rails along the path,
   a plurality of inductor plates mounted at each one of the stations,
   a plurality of receiver coils at each one of the stations,
   a permanent magnetic module mounted on each one of the two disks,
   a magnetic suspension transmission located between each one of the two disks and the magnetic suspension motor-generator.

2. The system according to claim 1, wherein the lithium accumulator module recovers, stores, and distributes the electrical energy produced by the movement of the subway train together with a magnetic suspension disk installed in each one of the subway trains.

3. The system according to claim 1, wherein the magnetic suspension motor-generator rotates each one of the two disks which generates a proportional induction to a levitating magnetic induction generator, providing electric pulses that are used by each one of the subway trains.

4. The system according to claim 1, wherein the plurality of induction coils capture the inductive energy of each one of the subway trains, wherein the induction makes a group of electric motors to rotate together with the magnetic suspension motor-generator, driven by a magnetic suspension disk in each station.

5. The system according to claim 1, further comprising a control module located at each one of the subway trains, on each one of the stations, and along the path.

6. The system according to claim 1, wherein when the subway train moves, movement displaces air, and the air is used to move other disks located along the path, together with the magnetic suspension motor generator and a mini motor.

7. The system according to claim 1, wherein the electrical energy from the magnetic suspension motor-generator passes to each one of the lithium accumulator modules and the energy is channeled to a network so that each one of the stations becomes self-sufficient and works without the energy received from 12 to 18 hours from the distribution network.

* * * * *